Nov. 14, 1950      R. A. DAVIS      2,529,651
FISHING BOAT HOLD AND COLD STORAGE CONSTRUCTION
Filed June 26, 1948      2 Sheets-Sheet 1
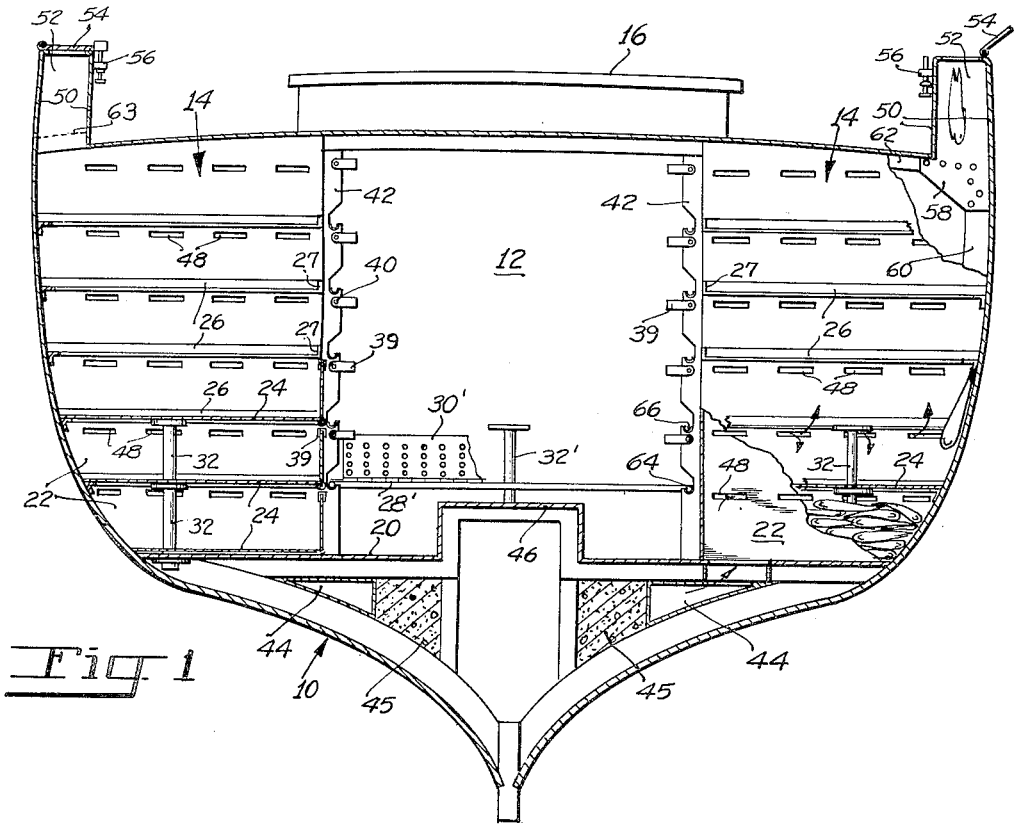
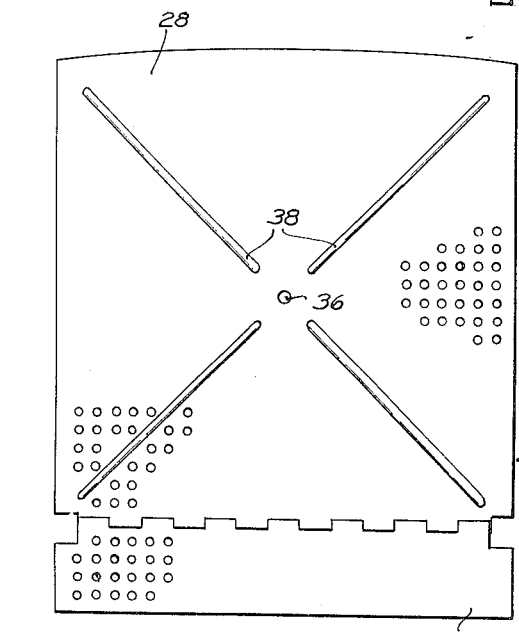
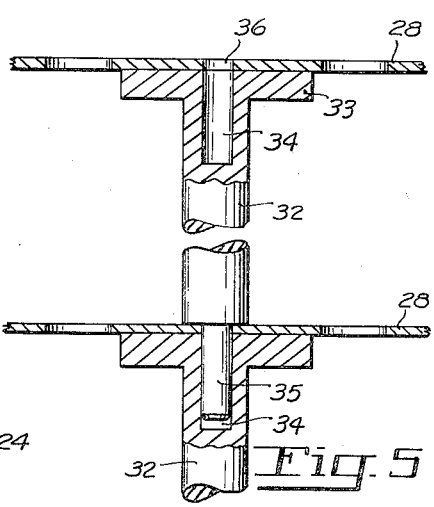
INVENTOR.
RAYMOND A. DAVIS
BY
Reynolds + Beach
ATTORNEYS

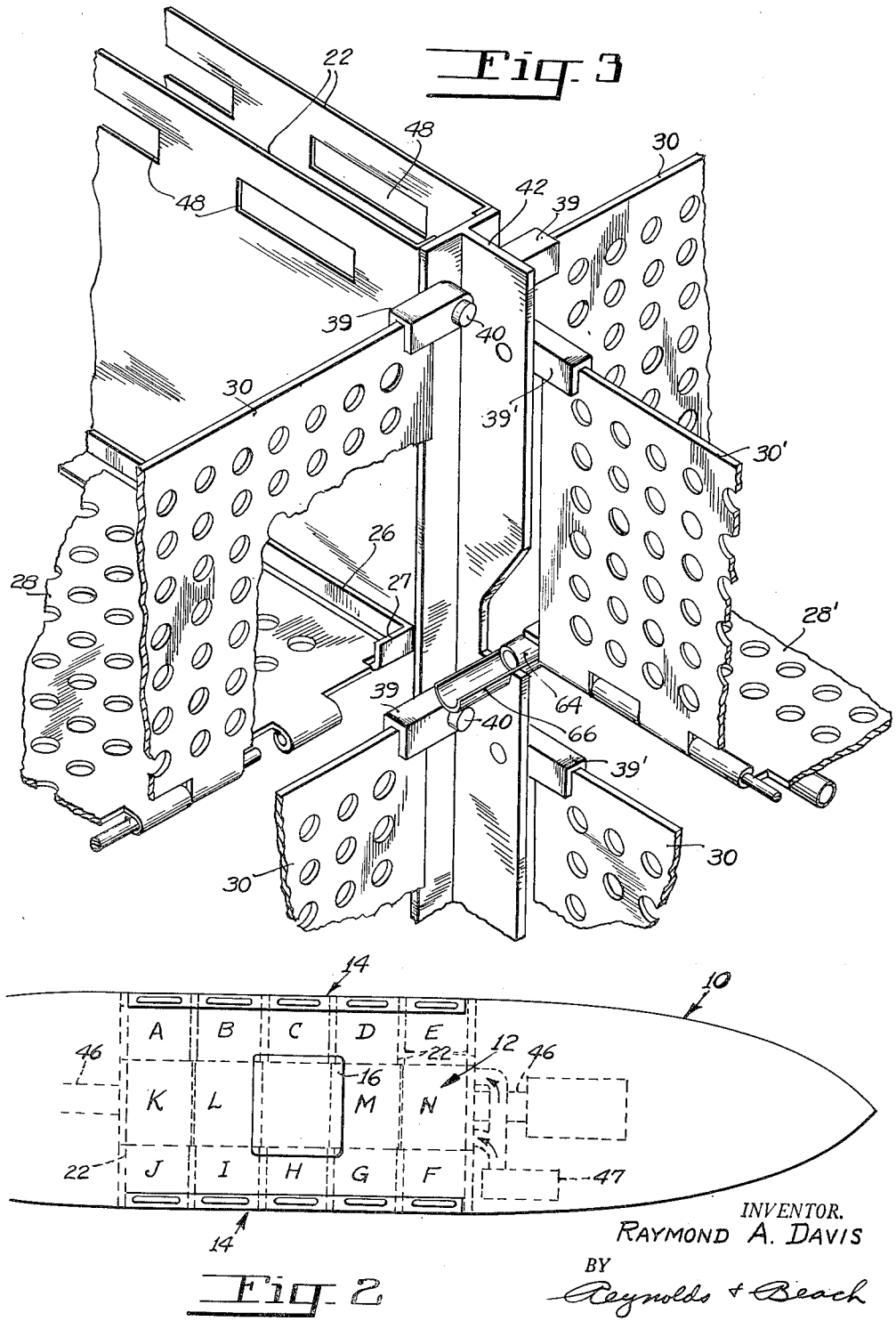

Patented Nov. 14, 1950

2,529,651

UNITED STATES PATENT OFFICE 2,529,651

FISHING BOAT HOLD AND COLD STORAGE CONSTRUCTION

Raymond A. Davis, Seattle, Wash.

Application June 26, 1948, Serial No. 35,507

9 Claims. (Cl. 62—14)

The present invention relates to improvements in the construction and use of commercial fishing vessels, and particularly to the loading, storing and preserving therein of fish caught for carrying them to port. General features of the invention concern special facilities for cold-storage of the fish in the vessel, and efficient loading arrangements cooperable with the storage means, as will be explained fully hereinafter.

Customarily, the fish caught are loaded into the hold of the vessel by heaping them in separate hold pens with alternate layers of crushed ice nearly to the full height of the pens. A vessel carrying twelve tons of fish, for example, may require as much as four tons, or more, of ice, this large amount of ice constituting no small item of expense when it is considered that the ice must be supplied for each trip out. In addition, the use of ice presents other and distinct problems. For instance, it makes loading and packing the fish in the hold a laborious and prolonged operation. Sometimes periods of the most favorable fishing are virtually wasted merely in order to pack the fish already caught, when a more rapid and efficient plan of loading and packing the fish might otherwise mean the difference between a substantial profit and no profit at all to the fisherman. Again, when the fish are packed en masse with ice in the manner described, the fish in the lower layers tend to become crushed and distorted from the sheer weight of the pile. This makes them difficult to handle in processing and makes them less attractive to the buyer. Consequently they bring lower prices.

These and other incidents of using ice and the described mass-packing method of storing the fish in the vessel have led to various experiments with refrigeration. Most of these experiments have been rudimentary, however. The use of refrigerating pipes located over and beneath the fish pens has been attempted, but with non-uniform results. In that case, the fish located well within the body of a pile and away from the pipes froze undesirably slowly, while those close to the pipes tended to become overly frozen. For reasons such as this it was apparent that the solution to the general problem would not be found in the mere basic concept of employing mechanical refrigeration. Moreover, many of the former loading problems would still remain, in the absence of improvements made deliberately in that direction.

It is an object of this invention to combine, in the construction and utilization of a fishing vessel, improvements, not only in the manner of storing and refrigerating the fish, but also in the manner of loading the same from the deck into the hold. The element of cost of applying the invention to a fishing vessel is also of prime concern. If there be a noticeable increase in the initial cost of constructing and equipping a fishing vessel according to the present invention, over previous costs, such increase, it is believed, will be quickly offset by other savings and advantages which are derived therefrom. The invention is not only applicable to the design and construction of new vessels, but also to the practicable modification of existing vessels of generally conventional design.

In broad terms, a feature of the invention relates to the use of fish-supporting trays or racks arranged in vertical banks in the separate hold pens. By use of this device for supporting the fish in smaller and separate piles quick and uniform cooling of all of the fish is made possible by the circulation of refrigerating air in and about the trays, entering the pens preferably through openings formed in wall ducts between adjacent pens. A further object is to provide trays which are removable, enabling loading the hold in the desired fashion, successively by trays commencing at the bottom.

A related further feature of the invention resides in the provision of loading chutes installed permanently beneath the rails of the vessel, one such chute extending down into each hold pen, and enabling the trays to be loaded quickly and easily, commencing with trays at the bottom of the hold. Preferably, these chutes are embodied directly in the rail structure, and they open at or near the tops of the rails where they are readily accessible.

The foregoing chute arrangement obviates the use of deck openings or hatches at or near the deck level, which have heretofore been relatively inaccessible and generally inconvenient. For instance, it is not infrequent that the deck of a vessel may be covered over with fish to a depth of one or more feet by unloading the nets thereon. At such times gaining access to a deck plate, or the like, to uncover an opening leading into the hold is difficult. Since the chute openings are comparatively small and may be uncovered individually only as needed the hold temperature may be kept uniformly low during loading, enabling rapid freezing of the fish stored therein. Other openings to the hold of the vessel may be closed during loading, thereby keeping out water washed on deck.

These and further features, objects and advantages of the invention will become further apparent upon considering the following description based upon the accompanying drawings.

Figure 1 is a sectional view taken transversely of the hold of a fishing vessel, showing a preferred arrangement for loading and storing the fish according to the invention.

Figure 2 is a diagrammatic plan view of the fishing vessel with the stern omitted, showing a typical arrangement of the banks of trays in the hold, as herein proposed.

Figure 3 is an isometric structural detail view showing the manner of mounting fish racks or trays in the hold.

Figure 4 is a top view of a typical fish tray or rack with its two parts unfolded.

Figure 5 is a fragmentary elevation view showing means to support the trays against sagging under load.

Much of the detail of the hull 10 of the illustrated fishing vessel has been omitted or simplified for convenience in illustration. It will be appreciated that the invention is generally applicable to any of the conventional fishing vessels, although it may be applied to some types more favorably than to others. In the conventional vessel, the fish hold is usually divided into a row of fish pens 14 at each side leaving a central aisle 12 between such pen rows known as the "slaughter house," across which there is usually no fixed partition. The slaughter house generally extends the full length of the hold. According to the present invention no change is required in this general plan of the hold. It is proposed, however, that the pen walls 22 be of double or hollow construction to afford cold air ducts rising between adjacent pens, to be used in effectuating the described system of cold storage of fish.

Instead of piling the fish en masse in the pens until each pen is filled solid, the fish are carried in smaller piles on separate trays or racks 24 removably mounted in the pens. The trays or similar fish supporting elements are independently supported on flanged rails 26, arranged in vertically spaced relation. As illustrated, each pen contains one bank of six trays. By this general arrangement air spaces may be left between the separate piles of fish on the trays for uniformly rapid penetration of cooling air from the wall ducts, and none of the fish are unduly compressed or distorted from the effects of the weight of a large pile.

The type of tray which I prefer for the purpose at hand, and herein illustrated is of two-part construction, consisting in a supporting bottom panel 28, and a retaining front panel 30 hingedly connected to the front edge of the supporting bottom 28, as shown. Hinge connecting the tray parts facilitates storage of the trays when not in use and simplifies unloading fish from them. The supporting bottom of each particular tray is of a form and size to bridge the width and depth of the pen at the particular tray location. The pen sides form common retaining sides for the trays and the vessel's hull forms a common back. The hinged tray fronts complete the tray closures and collectively define front walls for the pens.

The trays can be made of a lightweight strong metal, such as one of the aluminum alloys—duralumin, for example—so that trays several feet or more in width and length are entirely practical. The trays may be appropriately ribbed or otherwise reinforced where deemed necessary to carry the fish load. If further support than the rails 26 is required for trays of large area, a column of props or posts 32 is provided, extending vertically, one post between successive trays, as shown in Figures 1 and 5. The posts 32 have enlarged circular flanges 33 on which the tray bottoms rest, and incorporated sockets 34 and cooperable pins 35 at their respective opposite ends which hold the successive posts aligned. As shown, the pins project into the sockets through locating apertures 36 in the respective tray bottoms. The individual posts may be positioned immediately preceding installation of the trays directly supported over them. When the trays are to be used with the posts 32, the tray bottoms are formed with reinforcing ribs 38 which preferably radiate outward from the apertures 36 to the four corners of a tray. The requirements of reinforced tray structure will obviously depend in any particular case upon individual installation specifications.

A tray is easily installed in a pan by sliding its rear corners along the appropriate pair of supporting rails 26, until the rear edge of the tray arrives at the hull wall, at which time the tray is locked in position by its dropping in place behind upstanding stops 27 formed at the front ends of the rails, as shown in Figure 3. The hinged tray front 30 is then conveniently swung up and secured in fish retaining position by securing its upper corners in the channels of swinging latches 39. The latches are pivoted on pins 40 anchored to the lateral flanges of structural T-iron members 42 which are mounted vertically with their backs or flat sides overlying the fronts of the respective pen partitions.

Both fronts and supporting bottoms of the trays are perforated, preferably throughout their entire areas, to permit cold air circulation through them to the fish. To supply cooling air to the individual banks of trays in the pens, main air ducts 44 are installed preferably in the bottom of the vessel, communicating with the several compartment wall ducts which branch upwardly therefrom. Conveniently, these main ducts are located alongside the concrete ballast slabs 45 beneath the hold floor 20 at either side of the propeller shaft housing 46, one main duct for each row of pens. As illustrated in Figure 2, both ducts are readily supplied with cold air from a single refrigeration unit 47. As shown in Figure 1, cold air enters the pens through groups of wall duct openings 48, a group lying beneath each of the tray supports 26, at which level they will not be obstructed by the trays nor by fish piled in the trays. Cold air entering the pens through these openings infiltrates the mass of fish in the tray above through the latter's perforated supporting bottom, and also fish in the tray below.

According to a further feature of the invention, the trays are loaded conveniently and expeditiously in the several pens, successively from the bottom trays upward, by means of individual pen chutes located directly beneath the vessel's side rails. In the preferred case the rail-supporting bulwarks 50 incorporate the chutes. Chute openings 52 are preferably formed directly in the rails themselves at fore and aft locations corresponding to the pens. Covers 54 normally close the rail openings to prevent water entering the hold through the chutes, and refrigerated air leaving the hold. These covers in opening preferably swing outward, as shown, to act as baffles for sea water breaking over the bulwarks and as deflector plates to aid in the channeling of fish into the chute openings.

The chute covers are separately locked, as indicated in Figure 1 by the representative screw-actuated locks 56 mounted on the inboard sides of the rails to engage the swinging cover edges. In this location of the locks the nets may be slid over the rails without danger of snagging on protuberances.

The hollow bulwarks 50 defining the fish chutes can be formed, optionally, either as a series of hollow sections extending fore and aft of the vessel and joined at their ends, each section overlying a fish pen, or as a continuous bulwark. Bulwark section ends or dividing walls 58, occurring at intervals fore and aft of the vessel, extend conveniently downward below the deck level where they constitute gusset plates bolted to the ribs and deck beams 60 and 62, respectively. The plates 58 not only strengthen the hull structure as such but at the same time provide a convenient mode of supporting the rails. Further bulwark support is obtainable by rail base flanges bolted to the deck members or the sides of the hull or by any other suitable means. Scuppers 63 at the base of the rails, at deck level, permit drainage of water from the deck but are located where they do not interfere with the dropping of fish through the rail defined chutes.

As indicated in Figure 1, the hollow pen partition walls are preferably located to straddle vessel's ribs, gusset plates, and deck beams.

In using the chutes to load the pens, all of the trays in a pen, but the one at the bottom, are first withdrawn entirely or sufficiently to provide clearance between their rear edges and the side of the hull for the fish to drop past them into the bottom tray. The natural curvature of the hull tends to deflect the dropping fish inwardly toward the tray fronts, particularly in the lower trays, minimizing the tendency for fish to pile up at the rear of the trays alongside the hull, but a fish peugh will ordinarily be used to level the fish in a tray as it is filled. When one tray is filled to the proper level, gauged by reference to the air duct openings 48, to be left unobstructed, the next higher tray will be installed to receive fish, and so on, until all the trays of a pen are loaded. The fishermen on deck are then directed to commence loading through a different rail chute.

A particular advantage gained with this general loading system, is the continual accessibility of the chute openings, notwithstanding the deck may be filled with fish up to the level of the rails after a particularly heavy catch.

If the "slaughter house" is also used for fish storage purposes, trays in that location similar to those used in the pens can be used in similar fashion to carry the fish and provide spaces for air circulation. These may be filled through hatches in the deck or through the rail chutes, as hereinafter described. In this case the tray bottoms have edge reinforcing members such as the pipes 64, preferably at their sides and front and back edges, to prevent them sagging. The various parts of these trays are generally designated in Figure 3 by primed numbers corresponding to the pen trays. Tray support is obtained by the ends of their side reinforcing members 64 resting in cradle supports 66 anchored to the T-iron members 42. Each support 66 is formed as a half-cylindrical section carried at its midpoint in the base of a notch formed in the central leg of the T-iron. Latches 39', pivoted to the legs of the T-iron members 42, hold the tray fronts in place. Posts 32', shown extending above the propeller shaft housing, prop the trays against sagging, as in the case of trays in the pens.

Preferably the "slaughter house" trays and pen trays are mounted at the same levels of elevation. Consequently, continuous spaces for cold air circulation are formed extending beneath corresponding trays in the pens and slaughter house, throughout the hold. The entire hold is more readily maintained at uniform temperature by the formation of such continuous air passages.

If loading the "slaughter house" trays through openings in the deck is not desirable, use of the rail chutes may be made also for loading these trays as well as those in the side pens. To illustrate this technique, the vessel diagrammed in Figure 2 has ten fish pens, five on a side, and provisions for four banks of trays in the slaughter house, two banks at either end of the hold. The rows of side pens are designated by letters A to E and F to J, respectively, and the slaughter house banks of trays by letters K to N, as shown. According to a suggested typical loading schedule, the lowermost tray in pen J will first be loaded, followed by installation of the bottom tray in pan A and with it the lowermost tray in adjoining bank K in the "slaughter house." The swinging front of the tray in pen A will be lowered and as fish are dropped into the pen A they will simply be drawn into the "slaughter house" tray with the aid of a fish peugh. When the latter tray is loaded, the tray in pen A will itself be loaded by raising its retaining front and continuing to send fish into pen A through its chute. The process may be repeated with the remaining successively higher trays in the banks K and A, etc., and then proceeding to the pen B and trays in slaughter house bank L, etc., until the entire hold is loaded with fish except for the pens C and H which may be loaded last, if desired, leaving empty only a final working space in the center of the hold beneath the hatch 16.

Unloading the hold will usually be carried out in reverse sequence. The task is greatly simplified by the use of trays since a tray may be unloaded simply by lowering its retaining front and dropping the fish into a receiving container, tray by tray.

I claim as my invention:

1. In a fishing vessel or the like, the combination comprising a plurality of fish pens arranged at the sides of the vessel and within its hold, a plurality of separate fish supporting trays mountable in vertically spaced relation within said pens to receive and support separate piles of fish thereon, and air duct means communicating with the spaces between said trays for effecting passage of cooling air substantially uniformly over all of said trays.

2. In a fishing vessel or the like, the combination comprising partitions spaced fore and aft of the vessel, defining fish pens arranged at the sides of the vessel and within its hold, a plurality of separate fish-supporting trays mountable in vertically spaced relation within said pens, cold air ducts formed within said individual partitions, for passage of air heightwise between said pens, a main cold air duct communicating with said partition ducts, and air-outlets formed in said partitions between trays for passage of cooling air over said supporting trays.

3. In a fishing vessel or the like, the combination comprising partitions spaced fore and aft of the vessel, defining fish pens arranged at the sides of the vessel and within its hold, a plurality of separate fish-supporting trays mountable in vertically spaced relation within said pens, cold air ducts formed within said individual partitions, for passage of air heightwise between said pens, a main cold air duct communicating with said partition ducts, air outlets formed in said partitions between trays for passage of cooling air over all of said supporting trays, and cooperable tray mounting means at the front ends of the partitions on opposite sides of the vessel's hold, for mounting additional fish-supporting trays in the space between opposing fish pens.

4. In a fishing vessel or the like, the combination comprising partitions spaced fore and aft of the vessel, defining fish pens arranged at the sides of the vessel and within its hold, a plurality of separate fish-supporting trays mountable in vertically spaced relation within said pens, cold air ducts formed within said individual partitions, for passage of air heightwise between said pens, a main cold air duct communicating with said partition ducts, and air outlets formed in said partitions between trays for passage of cooling air throughout said supporting trays, said supporting trays comprising apertured supporting bottoms extending transversely between opposing pen partitions, and apertured retaining fronts.

5. A cold storage compartment structure comprising spaced walls, a plurality of demountable storage trays extending transversely between said walls at intervals spaced heightwise thereof, said trays comprising apertured supporting bottoms and retaining fronts pivoted to said bottoms for swinging upward into retaining position, and air passage means formed within said walls to distribute cooling air substantially uniformly through and between said trays.

6. A cold storage compartment structure comprising spaced walls, a plurality of demountable storage trays extending transversely between said walls at intervals spaced heightwise thereof, said trays comprising apertured supporting bottoms and retaining fronts pivoted to said bottoms for swinging upward into retaining position, and tray-supporting posts extending heightwise between successive trays, said supporting posts interengaging mutually to form a supporting column for said trays, air-passage means formed within at least one of said walls to distribute cooling air substantially uniformly through and between said trays.

7. In a fishing vessel or the like, the combination comprising a side rail and supporting bulwark therefor, an opening in said rail, cover means for said opening, and a fish-loading chute incorporated within said bulwark beneath said rail, extending downwardly from said rail opening directly into the hold of the vessel.

8. In a fishing vessel, a loading and cold storage system for fish, comprising a plurality of fish pens at the sides of the vessel's hold, cold air ducts formed between said pens and having air outlets for passage of cooling air substantially uniformly throughout said pens, a distribution duct extending fore and aft of the vessel along the bottom of the hull communicating with said cold air ducts, a plurality of fish supporting trays removably mountable transversely in said pens and in vertically spaced relation therein, said trays being apertured for passage of cooling air therethrough, and individual rail-structure-defined chutes extending downwardly into the vessel's hold along the side of the hull for loading of fish into said trays.

9. In a fishing vessel, a loading and cold storage system for fish, comprising a plurality of fish pens at the sides of the vessel's hold, cold air ducts formed between said pens and having air outlets for passage of cooling air substantially uniformly throughout said pens, a distribution duct extending fore and aft of the vessel along the bottom of the hull communicating with said cold air ducts, a plurality of insertable fish supporting trays mountable transversely in said pens and in vertically spaced relation therein, said trays comprising apertured supporting bottoms and apertured fronts hinged to said bottoms for swinging from folded position into upraised position enclosing the fronts of said pens, and individual chutes beneath the rail and extending downwardly into the vessel's hold along the side of the hull for loading of fish into said trays.

RAYMOND A. DAVIS.

REFERENCES CITED

The following references are of record in the file of this patent:

UNITED STATES PATENTS

| Number | Name | Date |
|---|---|---|
| 680,692 | Burrell | Aug. 20, 1901 |
| 1,835,085 | Robson | Dec. 8, 1931 |
| 1,881,079 | Hiller | Oct. 4, 1932 |
| 1,900,867 | Olds | Mar. 7, 1933 |
| 1,947,327 | Brettell | Feb. 13, 1934 |
| 2,039,399 | Englis | May 5, 1936 |
| 2,145,323 | Stafford | Jan. 31, 1939 |
| 2,183,732 | Zarotschenzeff | Dec. 19, 1939 |
| 2,475,513 | Peckinpaugh | July 5, 1949 |

FOREIGN PATENTS

| Number | Country | Date |
|---|---|---|
| 3,320 | Great Britain | of 1881 |
| 314,742 | Great Britain | July 4, 1929 |